(12) United States Patent
Dai et al.

(10) Patent No.: US 8,369,302 B2
(45) Date of Patent: Feb. 5, 2013

(54) SYSTEM AND METHOD FOR MAPPING REFERENCE SIGNAL SEQUENCE IN ADVANCED LONG TERM EVOLUTION SYSTEM

(75) Inventors: Bo Dai, Shenzhen (CN); Xin Wu, Shenzhen (CN); Guanghui Yu, Shenzhen (CN); Zhisong Zuo, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/257,688

(22) PCT Filed: Mar. 15, 2010

(86) PCT No.: PCT/CN2010/071054
§ 371 (c)(1),
(2), (4) Date: Mar. 22, 2012

(87) PCT Pub. No.: WO2010/148668
PCT Pub. Date: Dec. 29, 2010

(65) Prior Publication Data
US 2012/0182974 A1    Jul. 19, 2012

(30) Foreign Application Priority Data

Nov. 10, 2009    (CN) .......................... 2009 1 0224715

(51) Int. Cl.
*H04B 7/208* (2006.01)
(52) U.S. Cl. ....................................................... 370/344
(58) Field of Classification Search .................. 370/203, 370/206, 208, 344
See application file for complete search history.

(56) References Cited

U.S. PATENT DOCUMENTS

| 2006/0018250 | A1 | 1/2006 | Gu et al. |
| 2009/0055703 | A1 | 2/2009 | Kim et al. |
| 2010/0195566 | A1* | 8/2010 | Krishnamurthy et al. .... 370/328 |
| 2010/0260154 | A1* | 10/2010 | Frank et al. .................... 370/336 |

FOREIGN PATENT DOCUMENTS

| CN | 101399761 A | 4/2009 |
| CN | 101510868 A | 8/2009 |

* cited by examiner

*Primary Examiner* — Kerri Rose
(74) *Attorney, Agent, or Firm* — McClure, Qualey & Rodack, LLP

(57) ABSTRACT

The present invention provides a method and system for mapping a reference signal sequence in an advanced Long Term Evolution (LTE) system, and the method and the system are used to map the reference signal sequence to an orthogonal frequency division multiplexing symbol of l. The method includes: when the system uses a normal cyclic prefix, determining the symbol l according to an expression, and mapping the reference signal sequence to a location of a sub-carrier k on the symbol l of an antenna port p. The system includes: a mapping module, a first acquiring module and a second acquiring module. The system and the method which are provided ensure the transmission performance while ensuring the interference randomization. In addition, the system and the method are compatible with existing LTE systems, thus realizing high-order Multiple Input Multiple Output (MIMO) transmission, supporting the usage of the corresponding techniques.

14 Claims, 8 Drawing Sheets

SYSTEM AND METHOD FOR MAPPING REFERENCE SIGNAL SEQUENCE IN ADVANCED LONG TERM EVOLUTION SYSTEM

CROSS REFERENCE RELATED APPLICATIONS

This application is a national phase of PCT/CN2010/071054 filed Mar. 15, 2010, which claims priority to China Application Serial No. 200910224715.4, filed Nov. 10, 2009, both of which are entirely incorporated herein by reference.

TECHNICAL FIELD

The present invention relates to an advanced long term evolution (Further Advancements for E-UTRA, LTE-Advanced or LTE-A) wireless communication system, and in particular, to a system and method for mapping a reference signal sequence in a LTE-A system.

BACKGROUND OF THE RELATED ART

Since the Multiple Input Multiple Output (MIMO) technology can increase system capacity, improve transmission performance, and be well integrated with other physical layer technologies, it becomes a key technology of Beyond third Generation (B3G) and fourth Generation (4G) mobile communication systems. However, when channel correlation is strong, the diversity gain and multiplexing gain due to a multipath channel will be greatly reduced, thus resulting in largely reduced performance of a MIMO system.

There is a new MIMO precoding method in the related art, which is an efficient mode of MIMO multiplexing. This method divides a MIMO channel into a plurality of independent virtual channels through precoding processes at a receiver and a transmitter. Since the effect of channel correlation is effectively eliminated, the precoding technique guarantees stable performance of the MIMO system in a variety of environments.

The Long Term Evolution (LTE) system is an important project of the Third Generation Partnership Project (3GPP). FIG. 1(a) and FIG. 1(b) are diagrams of frame structures for a Frequency Division Duplex (FDD) mode and a Time Division Duplex (TDD) mode of the LTE system, respectively.

In the frame structure of the FDD mode shown in FIG. 1(a), a radio frame of 10 ms is composed of twenty time slots with a length of 0.5 ms each, numbered from 0 to 19, and time slots $2i$ and $2i+1$ compose a subframe i with a length of 1 ms.

In the frame structure of the TDD mode shown in FIG. 1(b), a radio frame of 10 ms is composed of two half frames with a length of 5 ms each, and a half frame contains five subframes with a length of 1 ms each. The subframe i is defined as two time slots $2i$ and $2i+1$ with a length of 0.5 ms each. Wherein, a special subframe contains three special time slots, namely, a Downlink Pilot Time Slot (DwPTS), a Guard Period (GP) and an Uplink Pilot Time Slot (UpPTS), of which a proportion relationship in a subframe has a total of nine configurations as shown in the following Table 1, wherein, $T_s$ is a sampling frequency.

TABLE 1 configurations of special time slots in a special subframe

| configurations of a special subframe | Using a normal cyclic prefix for the downlink | | | Using an extended cyclic prefix for the downlink | | |
|---|---|---|---|---|---|---|
| | | UpPTS | | | UpPTS | |
| | DwPTS | Using a normal cyclic prefix for the uplink | Using an extended cyclic prefix for the uplink | DwPTS | Using a normal cyclic prefix for the uplink | Using an extended cyclic prefix for the uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In the two frame structures, when the system uses the Normal Cyclic Prefix (Normal CP), a time slot has a length of seven uplink/downlink symbols; and when the system uses the Extend CP, a time slot has a length of six uplink/downlink symbols. The aforementioned symbols are Orthogonal Frequency Division Multiplexing (OFDM) symbols.

A Resource Element (RE) is a sub-carrier on a OFDM symbol, while a downlink Resource Block (RB) consists of twelve consecutive sub-carriers and seven (six when the Extended CP is used) consecutive OFDM symbols, which is 180 kHz in the frequency domain, and has a length of a general time slot in the time domain, as shown in FIG. 2. The LTE system allocates resources with a RB as a basic unit during the resource allocation.

The LTE system supports a MIMO application of four antennas, and corresponding antenna port #0, antenna port #1, antenna port #2 and antenna port #3 adopt a mode of full bandwidth Cell-specific Reference Signals (CRS). When the CP is the Normal CP, locations of these CRSs in a physical RB are shown in FIG. 3(a). When the CP is the Extended CP, locations of these CRSs in a physical RB are shown in FIG. 3(b). In FIG. 3(a) and FIG. 3(b), abscissa 1 refers to serial numbers of subframes in the OFDM symbol, i.e., $C_1$, $C_2$, $C_3$ and $C_4$, which correspond to the logical port #0, the logical port #1, the logical port #2 and the logical port #3 of the CRSs.

In addition, there are UE-specific reference signals, which are only transmitted on locations in the time-frequency domain where the user-specific Physical Downlink Shared Channel (PDSCH) is. Wherein, functions of these CRSs comprise downlink channel quality measurement and downlink channel estimation (demodulation).

The advanced long term evolution (Further Advancements for E-UTRA,LTE-Advanced or LTE-A) is an evolution version of LTE Release-8. In addition to meeting or exceeding all relevant requirements of 3GPP TR 25.913: "Requirements for Evolved UTRA (E-UTRA) and Evolved UTRAN (E-UTRAN)", IMT-Advanced requirements proposed by the International Telecommunications Union-Radio (ITU-R) are required to be achieved or exceeded. Wherein, requirements of backward compatibility with the LTE Release-8 refer to that terminals of the LTE Release-8 can operate in a LTE-Advanced network; and terminals of LTE-Advanced can operate in a LTE Release-8 network.

Additionally, LTE-Advanced should be able to operate under configurations of different size spectrums, including a configuration of a spectrum wider than that of the LTE Release-8 (such as consecutive spectrum resources of 100 MHz), so as to achieve higher performance and a higher target peak rate.

Since the LTE-Advanced network needs to be able to access LTE subscribers, an operational band of the LTE-Advanced network should cover the current LTE band, while there is already no consecutive spectrum bandwidth of 100 MHz which can be allocated in the band, and therefore a direct technology to be addressed by the LTE-Advanced is to aggregate a plurality of consecutive component carrier frequencies (spectrums) distributed in different bands by means of a component carrier technology, to form a bandwidth of 100 MHz which can be used by the LTE-advanced. That is, the aggregated spectrum is divided into n component carrier frequencies (spectrums), and the spectrum within each component carrier frequency (spectrum) is consecutive.

In the LTE-Advanced requirement study report TR 36.814 V0.1.1 proposed in September 2008, it is explicit that the downlink of the LTE-Advanced can at most support an application of eight antennas. For the purpose of supporting the application of 8 antennas and using techniques such as Coordinated Multiple Point (CoMP), dual stream beamforming, etc., a basic framework (way forward) for designing downlink reference signals of the LTE-Advanced is determined for the LTE-Advanced at the 56th conference of 3GPP in February 2009. The downlink reference signals operating the LTE-Advanced are defined as two types of reference signals, i.e., a PDSCH demodulation oriented reference signal and a Channel State Information (CSI) generation oriented reference signal. Moreover, the PDSCH demodulation oriented reference signal is transmitted based on layers, and each layer corresponds to a kind of reference signal. The maximum of layers supported in the LTE-Advanced system is eight.

At present, time frequency locations of reference signals about two layers in a subframe have already been determined, as shown in FIG. 4(a) and FIG. 4(b), and there are two modes for mapping a sequence, i.e, mapping a sequence to the frequency domain first and then the time domain; alternatively, mapping sequences one by one according to the physical RBs, and then mapping the sequences to the frequency domain and then the time domain, in the physical RBs. However, both schemes have no specific implementation method, and therefore, it is necessary to provide a specific implementation method, so as to guarantee an application of multi-antenna transmission functions.

SUMMARY OF THE INVENTION

The technical problem to be solved by the present invention is in that there is a need to provide a system and method for mapping a reference signal sequence in a LTE-A system, and the system and the method are used to mapping the reference signal sequence to corresponding physical resources.

In order to solve the aforementioned technical problem, first, the present invention provides a method for mapping a reference signal sequence in an advanced long term evolution system, which is used to map the reference signal sequence to an orthogonal frequency division multiplexing symbol l, comprising: determining the symbol l according to the following expression when the system uses a normal cyclic prefix:

$$l = \begin{cases} l' \bmod 2 + 2 + 3 \cdot \lfloor l'/2 \rfloor & \text{when the current subframe is a} \\ & \text{special subframe,} \\ & \text{and a configuration of the special} \\ & \text{subframe is 1, 2, 6 or 7} \\ l' \bmod 2 + 2 & \text{when the current subframe is a} \\ & \text{special subframe,} \\ & \text{and a configuration of the special} \\ & \text{subframe is 3, 4 or 8} \\ l' \bmod 2 + 5 & \text{when the current subframe is a non-} \\ & \text{special subframe} \end{cases}$$

$$l' = \begin{cases} 0, 1, 2, 3 & n_s \bmod 2 = 0, \text{ when the current subframe is a} \\ & \text{special subframe,} \\ & \text{and a configuration of the special subframe is} \\ & \text{1, 2, 6 or 7} \\ 0, 1 & n_s \bmod 2 = 0, \text{ when the current subframe is not} \\ & \text{a special subframe,} \\ & \text{or a configuration of the special subframe is} \\ & \text{not 1, 2, 6 or 7} \\ 2, 3 & n_s \bmod 2 = 1, \text{ when the current subframe is not} \\ & \text{a special subframe,} \\ & \text{or a configuration of the special subframe is not} \\ & \text{1, 2, 6 or 7} \end{cases}$$

wherein, $n_s$ is an index of a time slot in a radio frame.

Preferably, the aforementioned method further comprises mapping the reference signal sequence to a location $a_{k,l}^{(p)}$ of a sub-carrier k on the symbol l of an antenna port p according to the following expression:

$$a_{k,l}^{(p)} = \begin{cases} r(12 \cdot n_{PRB} + 3 \cdot l' + m') & \text{when } p = 7 \\ s \cdot r(12 \cdot n_{PRB} + 3 \cdot l' + m') & \text{when } p = 8 \end{cases}$$

wherein, $a_{k,l}^{(p)}$ refers to a location of the sub-carrier k on the symbol l of the antenna port p;

$k = 5 \cdot m' + N_{sc}^{RB} \cdot n_{PRB} + 1$, or $k = 5 \cdot m' + N_{sc}^{RB} \cdot n_{PRB}$;

$s = (-1)^{n_{PRB}+l'+m'}$, or $s = (-1)^{n_{PRB}+l'+m'+n_s}$, or $s = (-1)^{n_{PRB}+l'+m'+\lfloor l'/2 \rfloor}$, or $s = (-1)^{l'}$;

m'=0, 1 or 2;

$n_{PRB}$ refers to an index of a physical RB allocated by the system;

$N_{sc}^{RB}$ refers to a number of sub-carriers contained in the RB.

The special subframe is a subframe containing DwPTS time slots.

Preferably, the aforementioned method further comprises mapping the reference signal sequence to a location $a_{k,l}^{(p)}$ of a sub-carrier k on the symbol l of an antenna port p according to the following expression:

$$a_{k,l}^{(p)} = \begin{cases} r(12 \cdot n_{PRB} + 3 \cdot l' + m') & \text{when } p = 7 \\ s \cdot r(12 \cdot n_{PRB} + 3 \cdot l' + m') & \text{when } p = 8 \text{ and } l' \bmod 2 = 0 \\ -s \cdot r(12 \cdot n_{PRB} + 3 \cdot l' + m') & \text{when } p = 8 \text{ and } l' \bmod 2 = 1 \end{cases}$$

wherein, $a_{k,l}^{(p)}$ refers to a location of the sub-carrier k on the symbol l of the antenna port p;

$k = 5 \cdot m' + N_{sc}^{RB} \cdot n_{PRB} + 1$, or $k = 5 \cdot m' + N_{sc}^{RB} \cdot n_{PRB}$;

$s = (-1)^{n_{PRB}+m'}$, or $s = (-1)^{n_{PRB}+m'+n_s}$, or $s = (-1)^{n_{PRB}+l'+m'+\lfloor l'/2 \rfloor}$, or $s = 1$;

m'=0, 1 or 2;

$n_{PRB}$ refers to an index of a physical RB allocated by the system;

$N_{sc}^{RB}$ refers to a number of sub-carriers contained in the RB.

Preferably, the aforementioned method further comprises mapping the reference signal sequence to a location $a_{k,l}^{(p)}$ of a sub-carrier k on the symbol l of an antenna port p according to the following expression:

$$a_{k,l}^{(p)} = \begin{cases} r(3 \cdot n_{PRB} + m' + 3 \cdot l' \cdot N_{RB}^{max,DL}) & \text{when } p = 7 \\ s \cdot r(3 \cdot n_{PRB} + m' + 3 \cdot l' \cdot M_{RB}^{max,DL}) & \text{when } p = 8 \end{cases}$$

wherein, $a_{k,l}^{(p)}$ refers to a location of the sub-carrier k on the symbol l of the antenna port p;

$k = 5 \cdot m' + N_{sc}^{RB} \cdot n_{PRB} + 1$, or $k = 5 \cdot m' + N_{sc}^{RB} \cdot n_{PRB}$;

$s = (-1)^{n_{PRB}+l'+m'}$, or $s = (-1)^{n_{PRB}+l'+m'+n_s}$, or $s = (-1)^{n_{PRB}+l'+m'+\lfloor l'/2 \rfloor}$, or $s = (-1)^{l'}$;

m'=0, 1 or 2;

$n_{PRB}$ refers to an index of a physical RB allocated by the system;

$N_{sc}^{RB}$ refers to a number of sub-carriers contained in the RB.

Preferably, the aforementioned method further comprises mapping the reference signal sequence to a location $a_{k,l}^{(p)}$ of a sub-carrier k on the symbol l of an antenna port p according to the following expression:

$$a_{k,l}^{(p)} = \begin{cases} r(3 \cdot n_{PRB} + m' + 3 \cdot l' + N_{RB}^{max,DL}) & \text{when } p = 7 \\ s \cdot r(3 \cdot n_{PRB} + m' + 3 \cdot l' \cdot N_{RB}^{max,DL}) & \text{when } p = 8 \text{ and } l' \bmod 2 = 0 \\ -s \cdot r(3 \cdot n_{PRB} + m' + 3 \cdot l' \cdot N_{RB}^{max,DL}) & \text{when } p = 8 \text{ and } l' \bmod 2 = 1 \end{cases}$$

wherein, $a_{k,l}^{(p)}$ refers to a location of the sub-carrier k on the symbol l of the antenna port p;

$k = 5 \cdot m' + N_{sc}^{RB} \cdot n_{PRB} + 1$, or $k = 5 \cdot m' + N_{sc}^{RB} \cdot n_{PRB}$;

$s = (-1)^{n_{PRB}+l'+m'}$, or $s = (-1)^{n_{PRB}+l'+m'+n_s}$, or $s = (-1)^{n_{PRB}+l'+m'+\lfloor l'/2 \rfloor}$, or $s = (-1)^{l'}$;

m'=0, 1 or 2;

$n_{PRB}$ refers to an index of a physical RB allocated by the system;

$N_{sc}^{RB}$ refers to a number of sub-carriers contained in the RB.

In order to solve the aforementioned technical problem, the present invention further provides a system for mapping a reference signal sequence in an advanced long term evolution system, which is used to map the reference signal sequence to an orthogonal frequency division multiplexing symbol l, comprising a mapping module, the mapping module is configured to determine the symbol l according to the following expression when the system uses a normal cyclic prefix:

$$l = \begin{cases} l' \bmod 2 + 2 + 3 \cdot \lfloor l'/2 \rfloor) & \text{when the current subframe is a special subframe, and a configuration of the special subframe is 1, 2, 6 or 7} \\ l' \bmod 2 + 2 & \text{when the current subframe is a special subframe, and a configuration of the special subframe is 3, 4 or 8} \\ l' \bmod 2 + 5 & \text{when the current subframe is a non-special subframe} \end{cases}$$

$$l' = \begin{cases} 0, 1, 2, 3 & n_s \bmod 2 = 0, \text{ when the current subframe is a special subframe, and a configuration of the special subframe is 1, 2, 6 or 7} \\ 0, 1 & n_s \bmod 2 = 0, \text{ when the current subframe is not a special subframe, or a configuration of the special subframe is not 1, 2, 6 or 7} \\ 2, 3 & n_s \bmod 2 = 1, \text{ when the current subframe is not a special subframe, or a configuration of the special subframe is not 1, 2, 6 or 7} \end{cases}$$

wherein, $n_s$ is an index of a time slot in a radio frame.

Preferably, the system further comprises a first acquiring module and a second acquiring module, wherein, the first acquiring module is configured to acquire the index $n_{PRB}$ of the physical RB allocated by the system;

the second acquiring module is configured to the number $N_{sc}^{RB}$ of the sub-carriers contained in the RB;

wherein, the mapping module is further configured to map the reference signal sequence to a location $a_{k,l}^{(p)}$ of a sub-carrier k on the symbol l of an antenna port p according to the index $n_{PRB}$ of the physical RB, the number $N_{sc}^{RB}$ of the sub-carriers and the following expression:

$$a_{k,l}^{(p)} = \begin{cases} r(12 \cdot n_{PRB} + 3 \cdot l' + m') & \text{when } p = 7 \\ s \cdot r(12 \cdot n_{PRB} + 3 \cdot l' + m') & \text{when } p = 8, \end{cases}$$

wherein, $k = 5 \cdot m' + N_{sc}^{RB} \cdot n_{PRB} + 1$, or $k = 5 \cdot m' + N_{sc}^{RB} \cdot n_{PRB}$;

$s = (-1)^{n_{PRB}+l'+m'}$, or $s = (-1)^{n_{PRB}+l'+m'+n_s}$, or $s = (-1)^{n_{PRB}+l'+m'+\lfloor l''/2 \rfloor}$, or $s = (-1)^{l'}$;

m'=0, 1 or 2;
alternatively.

$$a_{k,l}^{(p)} = \begin{cases} r(12 \cdot n_{PRB} + 3 \cdot l' + m') & \text{when } p = 7 \\ s \cdot r(12 \cdot n_{PRB} + 3 \cdot l' + m') & \text{when } p = 8 \text{ and } l' \bmod 2 = 0 \\ -s \cdot r(12 \cdot n_{PRB} + 3 \cdot l' + m') & \text{when } p = 8 \text{ and } l' \bmod 2 = 1, \end{cases}$$

wherein, $s = (-1)^{n_{PRB}+m'}$, or $s = (-1)^{n_{PRB}+m'+n_s}$, or $s = (-1)^{n_{PRB}+m'+\lfloor l''/2 \rfloor}$, or s=1;
alternatively, $$a_{k,l}^{(p)} = \begin{cases} r(3 \cdot n_{PRB} + m' + 3 \cdot l' \cdot N_{RB}^{max,DL}) & \text{when } p = 7 \\ s \cdot r(3 \cdot n_{PRB} + m' + 3 \cdot l' \cdot N_{RB}^{max,DL}) & \text{when } p = 8, \end{cases}$$

wherein, $s = (-1)^{n_{PRB}+l'+m'}$, or $s = (-1)^{n_{PRB}+l'+m'+n_s}$, or $s = (-1)^{n_{PRB}+l'+m'+\lfloor l''/2 \rfloor}$, or $s = (-1)^{l'}$;
alternatively, $$a_{k,l}^{(p)} = \begin{cases} r(3 \cdot n_{PRB} + m' + 3 \cdot l' \cdot N_{RB}^{max,DL}) & \text{when } p = 7 \\ s \cdot r(3 \cdot n_{PRB} + m' + 3 \cdot l' \cdot N_{RB}^{max,DL}) & \text{when } p = 8 \text{ and } l' \bmod 2 = 0 \\ -s \cdot r(3 \cdot n_{PRB} + m' + 3 \cdot l' \cdot N_{RB}^{max,DL}) & \text{when } p = 8 \text{ and } l' \bmod 2 = 1, \end{cases}$$

wherein, $s = (-1)^{n_{PRB}+m'}$, or $s = (-1)^{n_{PRB}+m'+n_s}$, or $s = (-1)^{n_{PRB}+m'+\lfloor l''/2 \rfloor}$, or s=1.

The special subframe is a subframe containing DwPTS time slots.

The system and the method according to the present invention ensure the transmission performance while ensuring the interference randomization. In addition, the system and the method are well compatible with existing LTE systems, thus realizing the high-order MIMO transmission, supporting the usage of the corresponding techniques, and improving the entire performance of the system.

Other features and advantages of the present invention will be set forth in the subsequent specification, and can be obviously seen from the specification partly, or can be understood from embodiments. The purpose and other advantages of the present invention can be implemented and obtained through the structure especially indicated in the specification, claims and accompanying drawings.

BRIEF DESCRIPTION OF DRAWINGS

Accompanying drawings are used to provide further understanding of the present invention, and constitute a part of the specification; and the accompanying drawings are only used to explain the present invention in combination with embodiments of the present invention, rather than limiting the present invention. In the accompanying drawings.

PREFERRED EMBODIMENTS OF THE PRESENT INVENTION

Figure 1A:
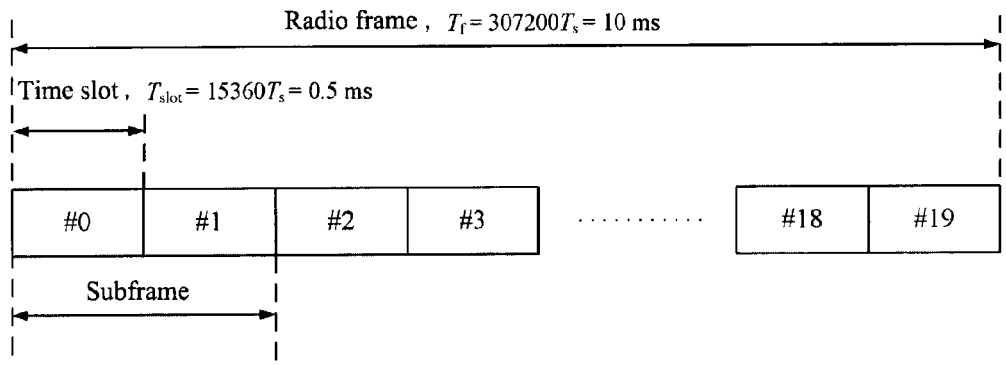
FIG. 1(a) is a diagram of a frame structure for a FDD mode of a LTE system.
Figure 1B:
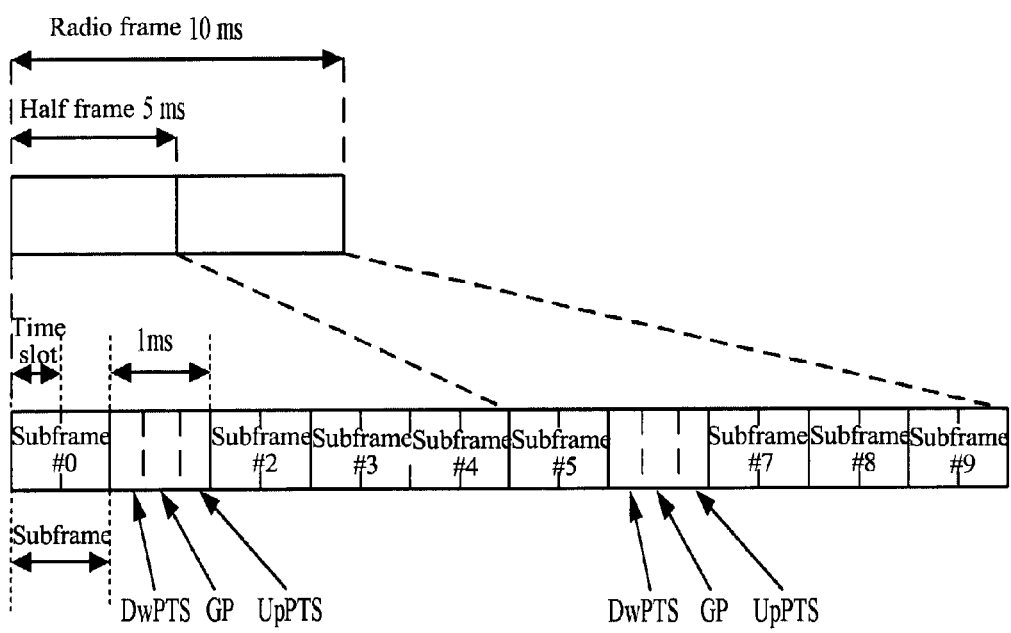
FIG. 1(b) is a diagram of a frame structure for a TDD mode of a LTE system.
Figure 2:
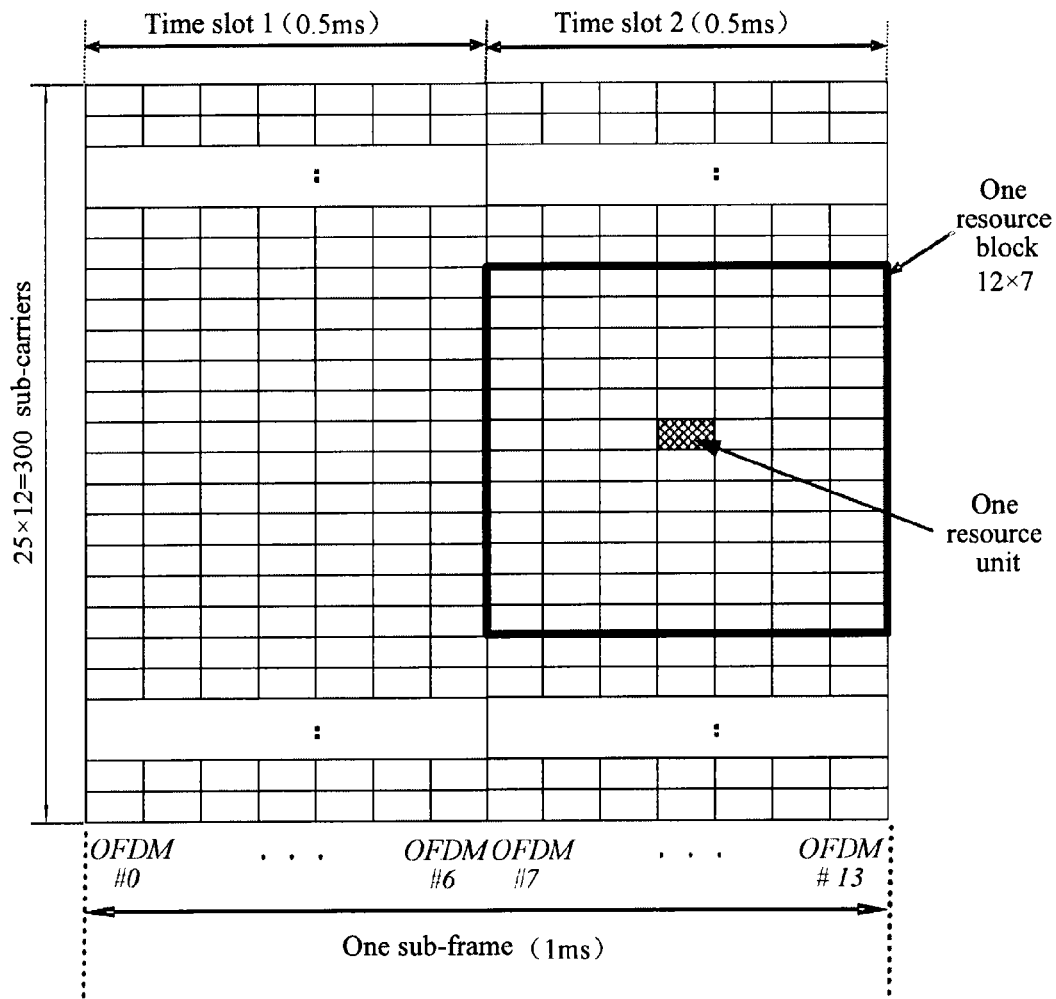
FIG. 2 is a diagram of a physical RB of a LTE system with a system bandwidth of 5 MHz.
Figure 3:
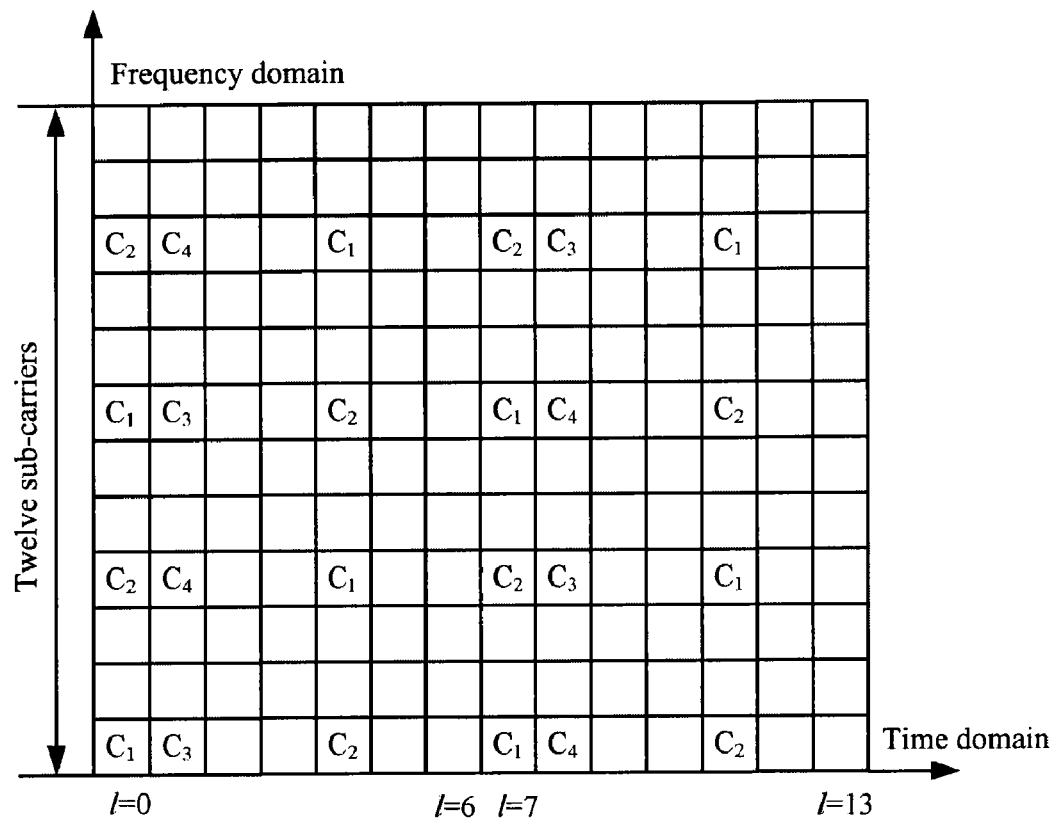
FIG. 3(a) is a diagram of locations of common reference signals in a physical RB for a normal CP.
FIG. 3(b) is a diagram of locations of common reference signals in a physical RB for an extended CP.
Figure 3:
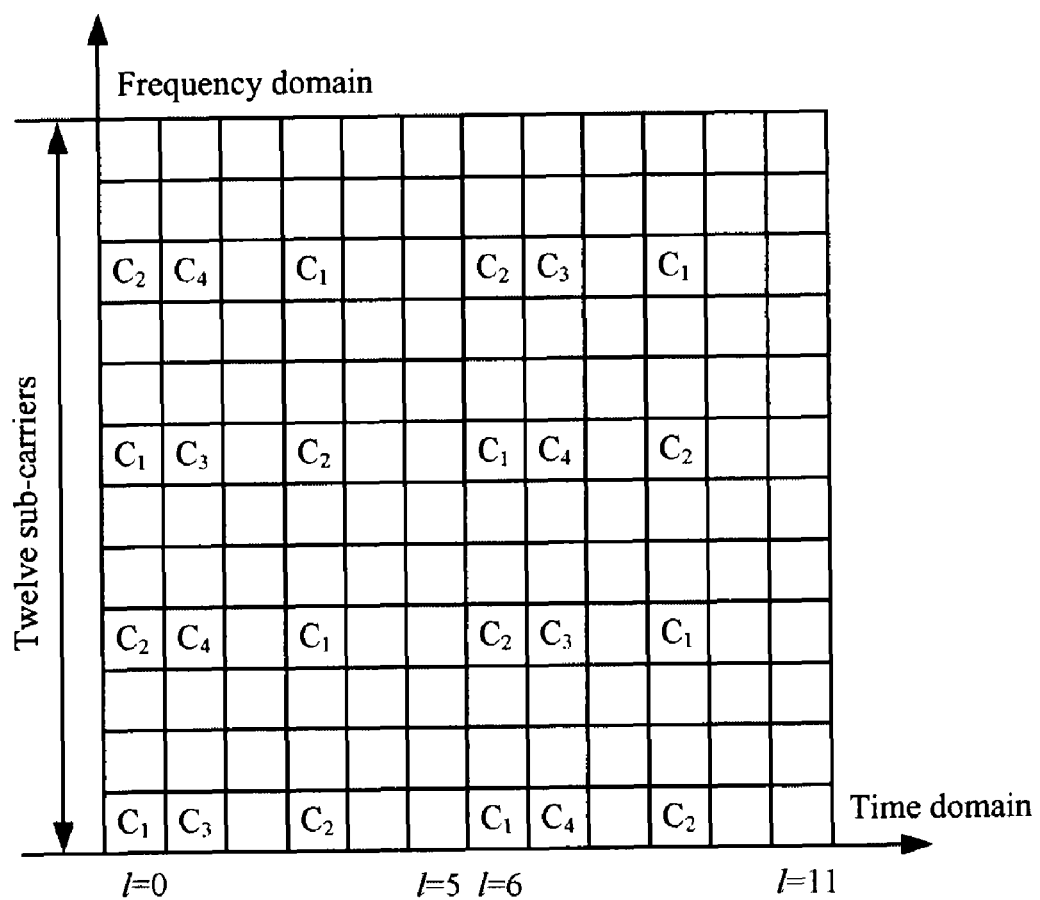

The implementation of the present invention will be illustrated in further detail in combination with accompanying drawings and embodiments hereinafter, and thus being able to fully understand and carry out the implementation process of how to apply a technique to solve a technical problem and to achieve a technical effect.

It should be illustrated that, if there is no conflict, the embodiments of the present invention and each feature in the embodiments can be combined with each other, and should belong to the scope of the present invention. In addition, steps shown in flow charts of the accompanying drawings can be performed in a computer system with a set of computer executable instructions for example; and although logical orders are shown in the flow charts, in some cases, the steps shown or described can be performed in a different order from those here.

In a method for transmitting reference signals for a LTE-Advanced system proposed in the present invention, the reference signal corresponding to each layer is respectively denoted as reference signal #0 of layer 1 and reference signal #1 of layer 2, and each reference signal is transmitted on respective layer.

In the method according to the present invention, a number of layers for transmitting reference signals is two, and the layers transmit the reference signal #0 and the reference signal #1 respectively.

The reference signal #0 is located on the $1^{st}$, $6^{th}$ and $11^{th}$ sub-carries of the penultimate symbol and the $1^{st}$, $6^{th}$ and $11^{th}$ sub-carries of the last symbol of the $1^{st}$ time slot, and the $1^{st}$, $6^{th}$ and $11^{th}$ sub-carries of the penultimate symbol and the $1^{st}$, $6^{th}$ and $11^{th}$ sub-carries of the last symbol of the $2^{nd}$ time slot, in a subframe; and the corresponding orthogonal codes are {1, 1}.

The reference signal #1 is located on the $1^{st}$, $6^{th}$ and $11^{th}$ sub-carries of the penultimate symbol and the $1^{st}$, $6^{th}$ and $11^{th}$ sub-carries of the last symbol of the $2^{nd}$ time slot, and the $1^{st}$, $6^{th}$ and $11^{th}$ sub-carries of the penultimate symbol and the $1^{st}$, $6^{th}$ and $11^{th}$ sub-carries of the last symbol, of the $2^{nd}$ time slot, in a subframe; and the corresponding orthogonal codes are one or two of {1, −1} and {−1, 1}.

Alternatively,

The reference signal #0 is located on the $2^{nd}$, $7^{th}$ and $12^{th}$ sub-carries of the penultimate symbol and the $2^{nd}$, $7^{th}$ and $12^{th}$ sub-carries of the last symbol of the $1^{st}$ time slot and the $2^{nd}$, $7^{th}$ and $12^{th}$ sub-carries of the penultimate symbol and the $2^{nd}$, $7^{th}$ and $12^{th}$ sub-carries of the last symbol, of the $2^{nd}$ time slot, in a subframe; and the corresponding orthogonal codes are {1, 1}.

The reference signal #1 is located on the $2^{nd}$, $7^{th}$ and $12^{th}$ sub-carries of the penultimate symbol and the $2^{nd}$, $7^{th}$ and $12^{th}$ sub-carries of the last symbol of the $2^{nd}$ time slot, and the $2^{nd}$, $7^{th}$ and $12^{th}$ sub-carries of the penultimate symbol and the $2^{nd}$, $7^{th}$ and $12^{th}$ sub-carries of the last symbol of the $2^{nd}$ time slot, in a subframe; and the corresponding orthogonal codes are one or two of {1, −1} and {−1, 1}.

A reference signal occupies three sub-carriers on an OFDM symbol in a physical RB.

Figure 4:
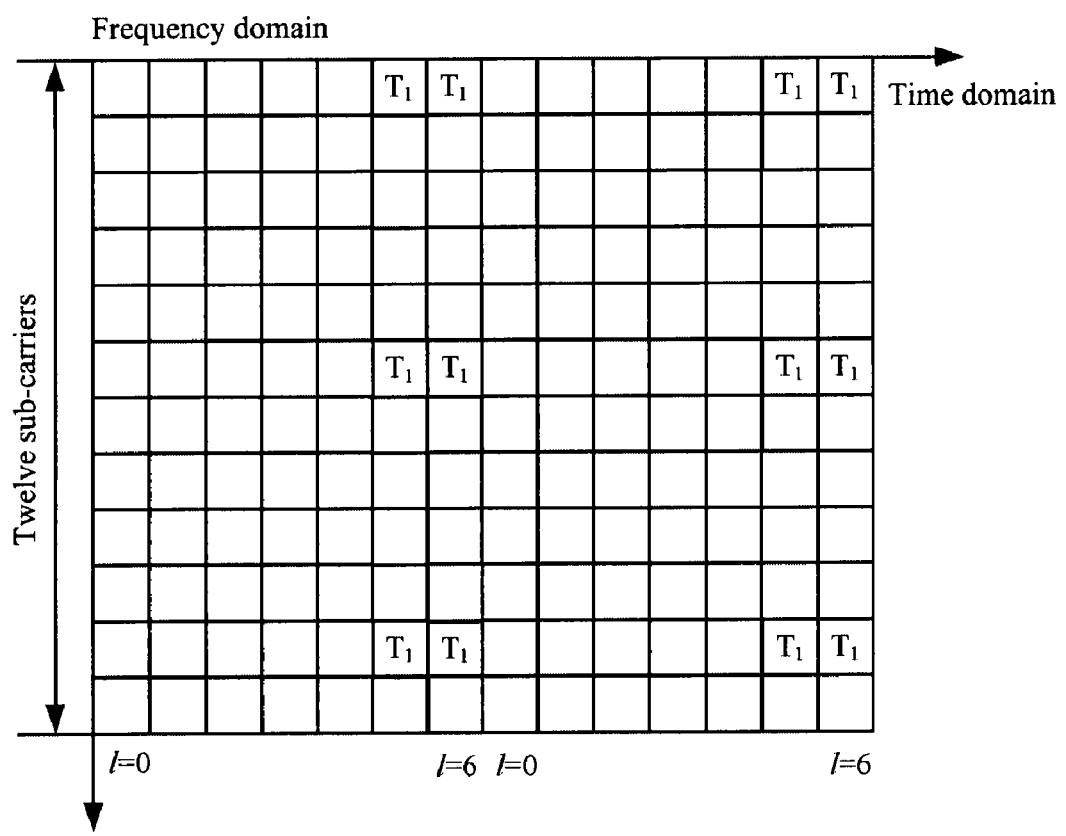
FIG. 4(a) is a diagram of a location of layer 1 of two layer reference signals in a physical RB for a normal CP.
FIG. 4(b) is a diagram of a location of layer 2 of two layer reference signals in a physical RB for a normal CP.
Figure 4B:
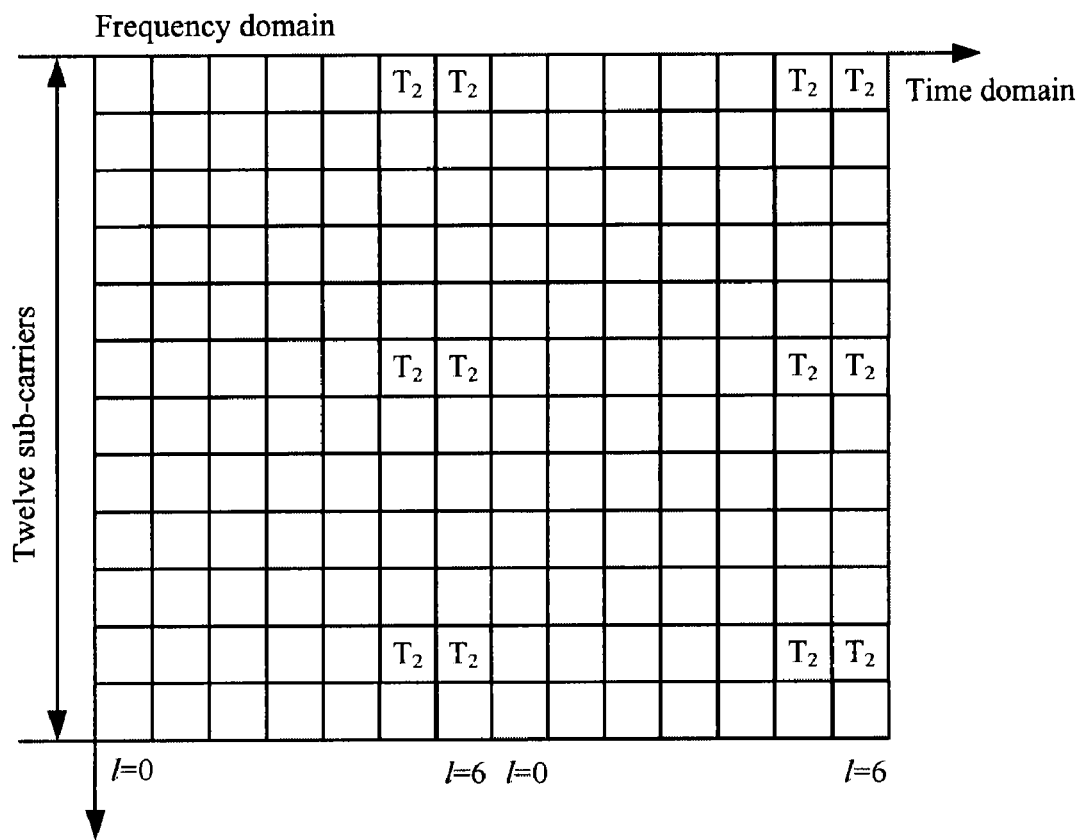

FIG. 4(a) and FIG. 4(b) illustrate specific carrier locations of reference signals based on layers in the corresponding RB thereof, in accordance with the method of the present invention in the first embodiment and the second embodiment.

Label $T_1$ and $T_2$ in FIG. 4(a) and FIG. 4(b) correspond to reference signal #0 of layer 1 and reference signal #1 of layer 2 respectively.

Embodiment One

The reference signals are only transmitted on locations in the time-frequency domain where a user-specific PDSH is. The antenna port (layer) number is p (p=7, 8), and then the method for generating and mapping reference signals of the antenna port 7 and the antenna port 8 is as follows.

The reference signal sequence r(m) is generated according to the following expression:

$$r(m) = \frac{1}{\sqrt{2}}(1 - 2 \cdot c(2m)) + j\frac{1}{\sqrt{2}}(1 - 2 \cdot c(2m+1)), \quad \text{Formula (1)}$$

$$m = 0, 1, \ldots, L-1$$

wherein,

L is a sequence length required by the reference signals.

The pseudo-random sequence c(i) is generated according to the following expression:

$$c(i) = (x_1(i+N_C) + x_2(i+N_C)) \bmod 2 \quad \text{Formula (2)}$$

$$x_1(i+31) = (x_1(i+3) + x_1(i)) \bmod 2 \quad \text{Formula (3)}$$

$$x_2(i+31) = (x_2(i+3) + x_2(i+2) + x_2(i+1) + x_2(i)) \bmod 2 \quad \text{Formula (4)}$$

wherein, $N_C = 1600$;

$x_1(0) = 1$, $x_1(n) = 0$, $n = 1, 2, \ldots, 30$;

$x_2$ is generated from the expression of $c_{init} = \sum_{n=0}^{30} x_2(n) \cdot 2^n$ according to an initial value of the pseudo-random sequence. The value of $c_{init}$ is as follows:

$$c_{init} = (\lfloor n_s/2 \rfloor + 1) \cdot (2N_{ID}^{cell} + 1) \cdot 2^{16} n_{SCID} \quad \text{Formula (5)}$$

wherein, $n_s$ is an index of a time slot in a radio frame;

$N_{ID}^{cell}$ is a cell identifier;

$\lfloor x \rfloor$ refers to an operation of rounding down; and the value of $n_{SCID}$ is 0 or 1, and is determined according to signaling.

L is the maximum system bandwidth $N_{RB}^{max,DL}$, and the specific mode for mapping the sequence to the sub-carrier k on the time domain OFDM symbol l of the antenna port p is as follows:

When the system uses the normal Cyclic Prefix, $$a_{k,l}^{(p)} = \begin{cases} r(12 \cdot n_{PRB} + 3 \cdot l' + m') & \text{when } p = 7 \\ s \cdot r(12 \cdot n_{PRB} + 3 \cdot l' + m') & \text{when } p = 8 \end{cases} \quad \text{Formula (6)}$$

wherein, $a_{k,l}^{(p)}$ refers to a location of the sub-carrier k on the time domain OFDM symbol l of the antenna port p.

$k = 5 \cdot m' + N_{sc}^{RB} \cdot n_{PRB} + 1$;

$s = (-1)^{n_{PRB} + l' + m'}$;

$$l = \begin{cases} l' \bmod 2 + 2 + 3 \cdot \lfloor l'/2 \rfloor & \text{when the current \textit{scence} is the} \\ & \text{DwPTS time slot,} \\ & \text{and a configuration of the special} \\ & \text{subframe is 1, 2, 6 or 7} \\ l' \bmod 2 + 2 & \text{when the current \textit{scence} is the} \\ & \text{DwPTS time slot,} \\ & \text{and a configuration of the special} \\ & \text{subframe is 3, 4 or 8} \\ l' \bmod 2 + 5 & \text{when the current \textit{scence} is not the} \\ & \text{DwPTS time slot} \end{cases};$$

$$l' = \begin{cases} 0, 1, 2, 3 & n_s \bmod 2 = 0, \text{when the current \textit{scence} is the} \\ & \text{DwPTS time slot,} \\ & \text{and a configuration of the special subframe} \\ & \text{is 1, 2, 6 or 7} \\ 0, 1 & n_s \bmod 2 = 0, \text{when the current \textit{scence} is not} \\ & \text{the DwPTS time slot,} \\ & \text{and a configuration of the special subframe} \\ & \text{is 1, 2, 6 or 7} \\ 2, 3 & n_s \bmod 2 = 1, \text{when the current \textit{scence} is not} \\ & \text{the DwPTS time slot,} \\ & \text{and a configuration of the special subframe} \\ & \text{is 1, 2, 6 or 7} \end{cases}$$

That is, $$l = \begin{cases} l' \bmod 2 + 2 + 3 \cdot \lfloor l'/2 \rfloor & \text{when the current subframe is a} \\ & \text{special subframe,} \\ & \text{and a configuration of the special} \\ & \text{subframe is 1, 2, 6 or 7} \\ l' \bmod 2 + 2 & \text{when the current subframe is a} \\ & \text{special subframe,} \\ & \text{and a configuration of the special} \\ & \text{subframe is 3, 4 or 8} \\ l' \bmod 2 + 5 & \text{when the current subframe is a non-} \\ & \text{special subframe} \end{cases};$$

$$l' = \begin{cases} 0, 1, 2, 3 & n_s \bmod 2 = 0, \text{ when the current subframe is a} \\ & \text{special subframe,} \\ & \text{and a configuration of the special subframe} \\ & \text{is 1, 2, 6 or 7} \\ 0, 1 & n_s \bmod 2 = 0, \text{ when the current subframe is not} \\ & \text{a special subframe,} \\ & \text{or a configuration of the special subframe is} \\ & \text{not 1, 2, 6 or 7} \\ 2, 3 & n_s \bmod 2 = 1, \text{ when the current subframe is not} \\ & \text{a special subframe,} \\ & \text{or a configuration of the special subframe is} \\ & \text{not 1, 2, 6 or 7} \end{cases}$$

$m' = 0, 1$ or 2;

wherein, the special subframe is a subframe containing DwPTS time slots;

$n_{PRB}$ refers to an index of a physical RB allocated by the system;

$N_{sc}^{RB}$ refers to a number of sub-carriers contained in the RB.

The orthogonal sequence index S in the aforementioned expression can also be $s=(-1)^{n_{PRB}+l'+m'n_s}$, or $s=(-1)^{n_{PRB}+l'+m'+\lfloor l'/2 \rfloor}$, or $s=(-1)^{l'}$; and the sub-carrier index k can also be $k=5 \cdot m'+N_{sc}^{RB} \cdot n_{PRB}$; alternatively, $$a_{k,l}^{(p)} = \begin{cases} r(12 \cdot n_{PRB} + 3 \cdot l' + m') & \text{when } p = 7 \\ s \cdot r(12 \cdot n_{PRB} + 3 \cdot l' + m') & \text{when } p = 8 \text{ and } l' \bmod 2 = 0 \\ -s \cdot r(12 \cdot n_{PRB} + 3 \cdot l' + m') & \text{when } p = 8 \text{ and } l' \bmod 2 = 1 \end{cases} \quad \text{Formula (7)}$$

wherein, $a_{k,l}^{(p)}$ refers to a location of the sub-carrier k on the time domain OFDM symbol l of the antenna port p.

$$k = 5 \cdot m' + N_{sc}^{RB} \cdot n_{PRB} + 1;$$

$$s = (-1)^{n_{PRB}+m'};$$

$$l = \begin{cases} l' \bmod 2 + 2 + 3 \cdot \lfloor l'/2 \rfloor & \text{when the current } scence \text{ is the} \\ & DwPTS \text{ time slot,} \\ & \text{and a configuration of the special} \\ & \text{subframe is 1, 2, 6 or 7} \\ l' \bmod 2 + 2 & \text{when the current } scence \text{ is the} \\ & DwPTS \text{ time slot,} \\ & \text{and a configuration of the special} \\ & \text{subframe is 3, 4 or 8} \\ l' \bmod 2 + 5 & \text{when the current } scence \text{ is not the} \\ & DwPTS \text{ time slot} \end{cases}$$

$$l' = \begin{cases} 0, 1, 2, 3 & n_s \bmod 2 = 0, \text{ when the current } scence \text{ is the} \\ & DwPTS \text{ time slot,} \\ & \text{and a configuration of the special subframe is} \\ & \text{1, 2, 6 or 7} \\ 0, 1 & n_s \bmod 2 = 0, \text{ when the current } scence \text{ is not} \\ & \text{the } DwPTS \text{ time slot,} \\ & \text{and a configuration of the special subframe is} \\ & \text{1, 2, 6 or 7} \\ 2, 3 & n_s \bmod 2 = 1, \text{ when the current } scence \text{ is not the} \\ & DwPTS \text{ time slot,} \\ & \text{and a configuration of the special subframe is} \\ & \text{1, 2, 6 or 7} \end{cases}$$

That is, $$l = \begin{cases} l' \bmod 2 + 2 + 3 \cdot \lfloor l'/2 \rfloor) & \text{when the current subframe is a} \\ & \text{special subframe,} \\ & \text{and the configuration of the current} \\ & \text{subframe is 1, 2, 6 or 7} \\ l' \bmod 2 + 2 & \text{when the current subframe is a} \\ & \text{special subframe,} \\ & \text{and the configuration of the current} \\ & \text{subframe is 3, 4 or 8} \\ l' \bmod 2 + 5 & \text{when the current subframe is a non-} \\ & \text{special subframe} \end{cases}$$

$$l' = \begin{cases} 0, 1, 2, 3 & n_s \bmod 2 = 0, \text{ when the current subframe is a} \\ & \text{special subframe,} \\ & \text{and the configuration of the current subframe is} \\ & \text{1, 2, 6 or 7} \\ 0, 1 & n_s \bmod 2 = 0, \text{ when the current subframe is not a} \\ & \text{special subframe,} \\ & \text{or the configuration of the current subframe is not} \\ & \text{1, 2, 6 or 7} \\ 2, 3 & n_s \bmod 2 = 1, \text{ when the current subframe is not a} \\ & \text{special subframe,} \\ & \text{or the configuration of the current subframe is not} \\ & \text{1, 2, 6 or 7} \end{cases}$$

and $m' = 0, 1$ or 2;

wherein, the special subframe is a subframe containing DwPTS time slots;

$n_{PRB}$ refers to an index of a physical RB allocated by the system;

$N_{sc}^{RB}$ refers to a number of sub-carriers contained in the RB.

The orthogonal sequence index s in the aforementioned expression can also be $s=(-1)^{n_{PRB}+m'n_s}$, or $s=(-1)^{n_{PRB}+m'+\lfloor l'/2 \rfloor}$, or $s=1$; and the sub-carrier index k can also be $k=5 \cdot m' + N_{sc}^{RB} \cdot n_{PRB}$.

Embodiment Two

The reference signals are only transmitted on locations in the time-frequency domain where a user-specific PDSH is. The antenna port (layer) number is p (p=7, 8), and then the specific mode for generating and mapping reference signals of the antenna port 7 and the antenna port 8 is as follows.

The reference signal sequence r(m) is generated according to the Formula (1) to Formula (5).

L is the maximum system bandwidth $N_{RB}^{max,DL}$, the specific method for mapping the sequence to the sub-carrier k on the time domain OFDM symbol l of the antenna port p, is as follows.

When the system uses the normal CP:

$$a_{k,l}^{(p)} = \begin{cases} r(3 \cdot n_{PRB} + m' + 3 \cdot l' \cdot N_{RB}^{max,DL}) & \text{when } p = 7 \\ s \cdot r(3 \cdot n_{PRB} + m' + 3 \cdot l' \cdot N_{RB}^{max,DL}) & \text{when } p = 8 \end{cases} \quad \text{Formula (8)}$$

wherein, $a_{k,l}^{(p)}$ refers to a location of the sub-carrier k on the time domain OFDM symbol l of the antenna port p.

$$k = 5 \cdot m' + N_{sc}^{RB} \cdot n_{PRB} + 1;$$

$$s = (-1)^{n_{PRB} + l' + m'};$$

$$l = \begin{cases} l' \bmod 2 + 2 + 3 \cdot \lfloor l'/2 \rfloor) & \text{when the current } scence \text{ is the} \\ & \text{DwPTS time slot,} \\ & \text{and a configuration of the special} \\ & \text{subframe is 1, 2, 6 or 7} \\ l' \bmod 2 + 2 & \text{when the current } scence \text{ is the} \\ & \text{DwPTS time slot,} \\ & \text{and a configuration of the special} \\ & \text{subframe is 3, 4 or 8} \\ l' \bmod 2 + 5 & \text{when the current } scence \text{ is not the} \\ & \text{DwPTS time slot} \end{cases};$$

$$l' = \begin{cases} 0, 1, 2, 3 & n_s \bmod 2 = 0, \text{ when the current } scence \text{ is the} \\ & \text{DwPTS time slot,} \\ & \text{and a configuration of the special subframe} \\ & \text{is 1, 2, 6 or 7} \\ 0, 1 & n_s \bmod 2 = 0, \text{ when the current } scence \text{ is not} \\ & \text{the DwPTS time slot,} \\ & \text{and a configuration of the special subframe} \\ & \text{is 1, 2, 6 or 7} \\ 2, 3 & n_s \bmod 2 = 1, \text{ when the current } scence \text{ is not} \\ & \text{the DwPTS time slot,} \\ & \text{and a configuration of the special subframe} \\ & \text{is 1, 2, 6 or 7} \end{cases}$$

That is, $$l = \begin{cases} l' \bmod 2 + 2 + 3 \cdot \lfloor l'/2 \rfloor) & \text{when the current subframe is a} \\ & \text{special subframe,} \\ & \text{and a configuration of the special} \\ & \text{subframe is 1, 2, 6 or 7} \\ l' \bmod 2 + 2 & \text{when the current subframe is a} \\ & \text{special subframe,} \\ & \text{and a configuration of the special} \\ & \text{subframe is 3, 4 or 8} \\ l' \bmod 2 + 5 & \text{when the current subframe is a non-} \\ & \text{special subframe} \end{cases};$$

$$l' = \begin{cases} 0, 1, 2, 3 & n_s \bmod 2 = 0, \text{ when the current subframe is a} \\ & \text{special subframe,} \\ & \text{and a configuration of the special subframe is} \\ & \text{1, 2, 6 or 7} \\ 0, 1 & n_s \bmod 2 = 0, \text{ when the current subframe is not a} \\ & \text{special subframe,} \\ & \text{or a configuration of the special subframe is not} \\ & \text{1, 2, 6 or 7} \\ 2, 3 & n_s \bmod 2 = 1, \text{ when the current subframe is not a} \\ & \text{special subframe,} \\ & \text{or a configuration of the special subframe is not} \\ & \text{1, 2, 6 or 7} \end{cases};$$

$$m' = 0, 1 \text{ or } 2;$$

wherein, the special subframe is a subframe containing DwPTS time slots;

$n_{PRB}$ refers to an index of a physical RB allocated by the system;

$N_{sc}^{RB}$ refers to a number of sub-carriers contained in the RB.

The orthogonal sequence index s in the aforementioned expression can also be $s=(-1)^{n_{PRB}+l'+m'n_s}$, or $s=(-1)^{n_{PRB}+l'+m'+\lfloor l'/2 \rfloor}$, or $s=(-1)^{l'}$; and the sub-carrier index k can also be $k=5 \cdot m'+N_{sc}^{RB} \cdot n_{PRB}$;

alternatively, $$a_{k,l}^{(p)} = \begin{cases} r(3 \cdot n_{PRB} + m' + 3 \cdot l' \cdot N_{RB}^{max,DL}) & \text{when } p = 7 \\ s \cdot r(3 \cdot n_{PRB} + m' + 3 \cdot l' \cdot N_{RB}^{max,DL}) & \text{when } p = 8 \text{ and } l' \bmod 2 = 0 \\ -s \cdot r(3 \cdot n_{PRB} + m' + 3 \cdot l' \cdot N_{RB}^{max,DL}) & \text{when } p = 8 \text{ and } l' \bmod 2 = 1 \end{cases}$$

wherein, $a_{k,l}^{(p)}$ refers to a location of the sub-carrier k on the time domain OFDM symbol l of the antenna port p.

$k = 5 \cdot m' + N_{sc}^{RB} \cdot n_{PRB} + 1;$ $s = (-1)^{n_{PRB} + m'};$ $$l = \begin{cases} l' \bmod 2 + 2 + 3 \cdot \lfloor l'/2 \rfloor & \text{when the current } scence \text{ is the } DwPTS \text{ time slot,} \\ & \text{and a configuration of the special subframe is 1, 2, 6 or 7} \\ l' \bmod 2 + 2 & \text{when the current } scence \text{ is the } DwPTS \text{ time slot,} \\ & \text{and a configuration of the special subframe is 3, 4 or 8} \\ l' \bmod 2 + 5 & \text{when the current } scence \text{ is not the } DwPTS \text{ time slot} \end{cases};$$

$$l' = \begin{cases} 0, 1, 2, 3 & n_s \bmod 2 = 0, \text{ when the current } scence \text{ is the } DwPTS \text{ time slot,} \\ & \text{and a configuration of the special subframe is 1, 2, 6 or 7} \\ 0, 1 & n_s \bmod 2 = 0, \text{ when the current } scence \text{ is not the } DwPTS \text{ time slot,} \\ & \text{and a configuration of the special subframe is 1, 2, 6 or 7} \\ 2, 3 & n_s \bmod 2 = 1, \text{ when the current } scence \text{ is not the } DwPTS \text{ time slot,} \\ & \text{and a configuration of the special subframe is 1, 2, 6 or 7} \end{cases};$$

That is, $$l = \begin{cases} l' \bmod 2 + 2 + 3 \cdot \lfloor l'/2 \rfloor & \text{when the current subframe is a special subframe,} \\ & \text{and a configuration of the special subframe is 1, 2, 6 or 7} \\ l' \bmod 2 + 2 & \text{when the current subframe is a special subframe,} \\ & \text{and a configuration of the special subframe is 3, 4 or 8} \\ l' \bmod 2 + 5 & \text{when the current subframe is a non-special subframe} \end{cases};$$

Formula (9)

$$l' = \begin{cases} 0, 1, 2, 3 & n_s \bmod 2 = 0, \text{ when the current subframe is a special subframe,} \\ & \text{and a configuration of the special subframe is 1, 2, 6 or 7} \\ 0, 1 & n_s \bmod 2 = 0, \text{ when the current subframe is not a special subframe,} \\ & \text{or a configuration of the special subframe is not 1, 2, 6 or 7} \\ 2, 3 & n_s \bmod 2 = 1, \text{ when the current subframe is not a special subframe,} \\ & \text{or a configuration of the special subframe is not 1, 2, 6 or 7} \end{cases};$$

and $m' = 0, 1 \text{ or } 2;$ wherein, the special subframe is a subframe containing DwPTS time slots;

$n_{PRB}$ refers to an index of a physical RB allocated by the system;

$N_{sc}^{RB}$ refers to a number of sub-carriers contained in the RB.

The orthogonal sequence index s in the aforementioned expression can also be $s=(-1)^{n_{PRB}+m' \cdot n_s}$, or $s=(-1)^{n_{PRB}+m'+\lfloor l'/2 \rfloor}$, or $s=1$; and the sub-carrier index k can also be $k=5 \cdot m'+N_{sc}^{RB} n_{PRB}$.

Figure 5:
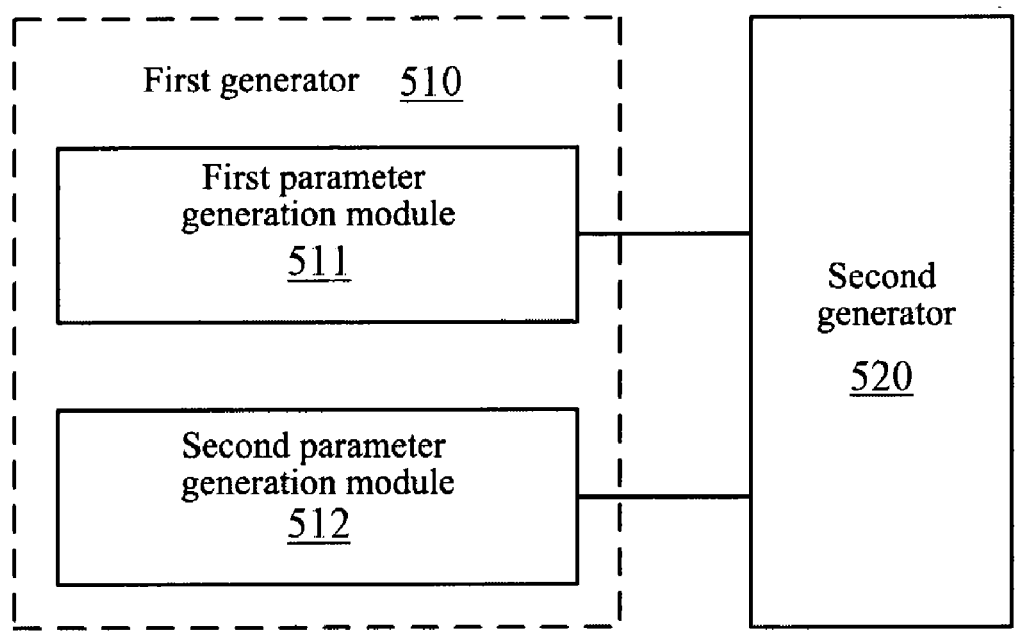
FIG. 5 is a diagram of a composition of an embodiment of a generating system in accordance with the present invention.

FIG. 5 is a diagram of a composition of an embodiment of a generating system in accordance with the present invention, and the embodiment of the generating system is used to generate reference signal sequences of the antenna port 7 and the antenna port 8. As shown in FIG. 5, the embodiment of the generating system primarily comprises a first generator 510 and a second generator 520.

Wherein, the first generator 510 is used to generate a pseudo-random sequence c(i) according to the following expression:

$c(i)=(x_1(i+N_C)+x_2(i+N_C)) \bmod 2;$ $x_1(i+31)=(x_1(i+3)+x_1(i)) \bmod 2;$ $x_2(i+31)=(x_2(i+3)+x_2(i+2)+x_2(i+1)+x_2(i)) \bmod 2;$ wherein, $N_C = 1600;$ $x_1(0)=1, x_1(n)=0, n=1, 2, \ldots, 30;$ $x_2$ is generated from the expression of $C_{init}=\Sigma_{n=0}^{30} x_2(n) \cdot 2^n$ according to an initial value of the pseudo-random sequence.

$c_{init}=(\lfloor n_s/2 \rfloor+1) \cdot (2N_{ID}^{cell}+1) \cdot (2^{16}+n_{SCID});$ wherein, $n_s$ is an index of a time slot in a radio frame;

$N_{ID}^{cell}$ is a cell identifier;

$\lfloor x \rfloor$ refers to an operation of rounding down; and the value of $n_{SCID}$ is 0 or 1, and is determined according to signaling.

The second generator 520 is connected with the first generator 510, and is used to generate a reference signal sequence r(m) according to the pseudo-random sequence c(i) and the following expression:

$$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, L-1;$$

wherein, L is the maximum system bandwidth.

As shown in FIG. 5, the first generator 510 comprises a first parameter generation module 511 and a second parameter generation module 512.

Wherein, the first parameter generation module 511 is connected with the second generator 520 and is used to generate a first parameter $x_1$ according to the expression of $x_1(i+31) = (x_1(i+3)+x_1(i))\bmod 2$, wherein, $x_1(0)=1$, $x_1(n)=0$, $n=1, 2, \ldots, 30$.

The second parameter generation module 512 is connected with the second generator 520, and is used to generate a second parameter $x_2$ from the expression of $c_{init} = \sum_{n=0}^{30} x_2(n) \cdot 2^n$ according to an initial value of the pseudo-random sequence, wherein, $$c_{init} = (\lfloor n_s/2 \rfloor + 1) \cdot (2N_{ID}^{cell} + 1) \cdot 2^{16} + n_{SCID},$$

wherein, $n_s$ is an index of a time slot in a radio frame;
$N_{ID}^{cell}$ is a cell identifier;
$\lfloor x \rfloor$ refers to an operation of rounding down; and
The value of $n_{SCID}$ is 0 or 1, and is determined according to signaling.

Figure 6:
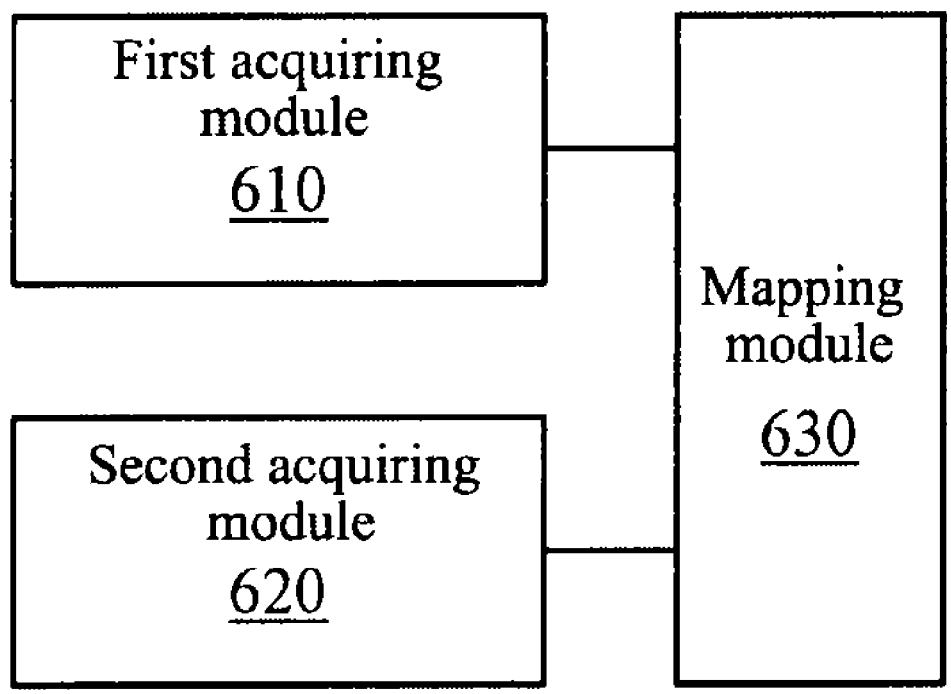
FIG. 6 is a diagram of a composition of an embodiment of a mapping system in accordance with the present invention.

FIG. 6 is a diagram of a composition of an embodiment of a mapping system in accordance with the present invention, and the mapping system is used to map a reference signal sequence. As shown in FIG. 6, the mapping system mainly comprises a first acquiring module 610, a second acquiring module 620 and a mapping module 630.

The first acquiring module 610 is configured to acquire an index $n_{PRB}$ of a physical RB allocated by the system.

The second acquiring module 620 is configured to acquire a number $N_{sc}^{RB}$ of sub-carriers contained in the RB.

The mapping module 630 is connected with the first acquiring module 610 and the second acquiring module 620, and is configured to map the reference signal sequence to a location $a_{k,l}^{(p)}$ of the sub-carrier k on the time domain OFDM symbol l of the antenna port p, according to the index $n_{PRB}$ of the physical RB, the number $N_{sc}^{RB}$ of the sub-carriers and the following expression, when the system uses the normal CP.

$$a_{k,l}^{(p)} = \begin{cases} r(12 \cdot n_{PRB} + 3 \cdot l' + m') & \text{when } p = 7 \\ s \cdot r(12 \cdot n_{PRB} + 3 \cdot l' + m') & \text{when } p = 8 \end{cases}$$

wherein, $$k = 5 \cdot m' + N_{sc}^{RB} \cdot n_{PRB} + 1,$$

or $$k = 5 \cdot m' + N_{sc}^{RB} \cdot n_{PRB};$$

$$s = (-1)^{n_{PRB} + l' + m'},$$

or $$s = (-1)^{n_{PRB} + l' + m' + n_s},$$

or $$s = (-1)^{n_{PRB} + l' + m' + \lfloor l'/2 \rfloor},$$

or $$s = (-1)^{l'};$$

$$l = \begin{cases} l'\bmod 2 + 2 + 3 \cdot \lfloor l'/2 \rfloor & \text{when the current } scence \\ & \text{is the } DwPTS \text{ time slot,} \\ & \text{and a configuration of} \\ & \text{the special subframe is} \\ & \text{1, 2, 6 or 7} \\ l'\bmod 2 + 2 & \text{when the current } scence \\ & \text{is the } DwPTS \text{ time slot,} \\ & \text{and a configuration of} \\ & \text{the special subframe is} \\ & \text{3, 4 or 8} \\ l'\bmod 2 + 5 & \text{when the current scence} \\ & \text{is not the } DwPTS \text{ time slot} \end{cases}$$

$$l' = \begin{cases} 0, 1, 2, 3 & n_s\bmod 2 = 0, \text{ when the current } scence \text{ is} \\ & \text{the } DwPTS \text{ time slot,} \\ & \text{and a configuration of the special} \\ & \text{subframe is 1, 2, 6 or 7} \\ 0, 1 & n_s\bmod 2 = 0, \text{ when the current } scence \text{ is} \\ & \text{not the } DwPTS \text{ time slot,} \\ & \text{and a configuration of the special} \\ & \text{subframe is 1, 2, 6 or 7} \\ 2, 3 & n_s\bmod 2 = 1, \text{ when the current scence is} \\ & \text{not the } DwPTS \text{ time slot,} \\ & \text{and a configuration of the special} \\ & \text{subframe is 1, 2, 6 or 7} \end{cases}$$

that is, $$l = \begin{cases} l'\bmod 2 + 2 + 3 \cdot \lfloor l'/2 \rfloor & \text{when the current subframe is} \\ & \text{a special subframe,} \\ & \text{and a configuration of the special} \\ & \text{subframe 1, 2, 6 or 7} \\ l'\bmod 2 + 2 & \text{when the current subframe is a} \\ & \text{special subframe,} \\ & \text{and a configuration of the special} \\ & \text{subframe is 3, 4 or 8} \\ l'\bmod 2 + 5 & \text{when the current subframe is a non-} \\ & \text{special subframe} \end{cases};$$

$$l' = \begin{cases} 0, 1, 2, 3 & n_s \bmod 2 = 0, \text{ when the current subframe is a special subframe,} \\ & \text{and a configuration of the special subframe is } 1, 2, 6 \text{ or } 7 \\ 0, 1 & n_s \bmod 2 = 0, \text{ when the current subframe is not a special subframe,} \\ & \text{or a configuration of the special subframe is not } 1, 2, 6 \text{ or } 7 \\ 2, 3 & n_s \bmod 2 = 1, \text{ when the current subframe is not a special subframe,} \\ & \text{or a configuration of the special subframe is not } 1, 2, 6 \text{ or } 7; \end{cases}$$

the special subframe is a subframe containing DwPTS time slots;

m'=0, 1 or 2.

alternatively, the mapping module 630 maps the reference signal sequence to $a_{k,l}^{(p)}$ according to the index $n_{PRB}$ of the physical RB, the number $N_{sc}^{RB}$ of the sub-carriers and the following expression:

$$a_{k,l}^{(p)} = \begin{cases} r(12 \cdot n_{PRB} + 3 \cdot l' + m') & \text{when } p = 7 \\ s \cdot r(12 \cdot n_{PRB} + 3 \cdot l' + m') & \text{when } p = 8 \text{ and } l' \bmod 2 = 0, \\ -s \cdot r(12 \cdot n_{PRB} + 3 \cdot l' + m') & \text{when } p = 8 \text{ and } l' \bmod 2 = 1 \end{cases}$$

wherein, $s=(-1)^{n_{PRB}+m'}$, or $s=(-1)^{n_{PRB}+m'+n_s}$, or $s=(-1)^{n_{PRB}+m'+\lfloor l''/2 \rfloor}$, or s=1;

alternatively, the mapping module 630 maps the reference signal sequence to $a_{k,l}^{(p)}$ according to the index $n_{PRB}$ of the physical RB, the number $N_{sc}^{RB}$ of the sub-carriers and the following expression:

$$a_{k,l}^{(p)} = \begin{cases} r(3 \cdot n_{PRB} + m' + 3 \cdot l' \cdot n_{RB}^{max,DL}) & \text{when } p = 7 \\ s \cdot r(3 \cdot n_{PRB} + m' + 3 \cdot l' \cdot N_{RB}^{max,DL}) & \text{when } p = 8 \end{cases},$$

wherein, $s=(-1)^{n_{PRB}+l'+m'}$, or $s=(-1)^{n_{PRB}+l'+m'+n_s}$, or $s=(-1)^{n_{PRB}+l'+m'+\lfloor l''/2 \rfloor}$, or $s=(-1)^{l'}$;

alternatively the mapping module 630 maps the reference signal sequence to $a_{k,l}^{(p)}$, according to the index $n_{PRB}$ of the physical RB, the number $N_{sc}^{RB}$ of the sub-carriers and the following expression:

$$a_{k,l}^{(p)} = \begin{cases} r(3 \cdot n_{PRB} + m' + 3 \cdot l' \cdot N_{RB}^{max,DL}) & \text{when } p = 7 \\ s \cdot r(3 \cdot n_{PRB} + m' + 3 \cdot l' \cdot N_{RB}^{max,DL}) & \text{when } p = 8 \text{ and } l' \bmod 2 = 0, \\ -s \cdot r(3 \cdot n_{PRB} + m' + 3 \cdot l' \cdot N_{RB}^{max,DL}) & \text{when } p = 8 \text{ and } l' \bmod 2 = 1 \end{cases}$$

wherein, $s=(-1)^{n_{PRB}+m'}$, or $s=(-1)^{n_{PRB}+m'+n_s}$, or $s=(-1)^{n_{PRB}+m'+\lfloor l''/2 \rfloor}$, or s=1;

Obviously, those skilled in the art should understand that each module or each step of the aforementioned present invention can be implemented with general computing devices, and can be integrated in a single computing device, or distributed onto a network consisting of a plurality of computing devices; alternatively, they can be implemented with program codes executable by the computing devices, and therefore, they can be stored in storage devices to be executed by the computing devices; alternatively, they are respectively made into a plurality of integrated circuit modules; alternatively, it is implemented with making several modules or steps of them into a single integrated circuit module. Thus, the present invention is not limited to any specific combinations of hardware and software.

Although the embodiments of the present invention are disclosed above, the disclosure is only the embodiments adopted to facilitate understanding of the present invention, and is not intended to limit the present invention. For those skilled in any technical art to which the present invention belongs, any modification or change can be made in forms and details of implementation without departing from the spirit and scope of the present invention; however, the patent protection scope of the present invention shall comply with the scope defined in the appended claims.

INDUSTRIAL APPLICABILITY

Compared with the prior art, the system and the method according to the present invention ensure the transmission performance while ensuring the interference randomization. In addition, the system and the method are well compatible with existing LTE systems, thus realizing the high-order MIMO transmission, supporting the usage of the corresponding techniques, and improving the entire performance of the system.

What is claimed is:

1. A method for mapping a reference signal sequence in an advanced long term evolution system, which is used to map the reference signal sequence to an orthogonal frequency division multiplexing symbol l, comprising: determining the symbol l according to following expressions when the system uses a normal cyclic prefix:

$$l = \begin{cases} l' \bmod 2 + 2 + 3 \cdot \lfloor l'/2 \rfloor) & \text{when the current subframe is a special subframe,} \\ & \text{and a configuration of the special subframe 1, 2, 6 or 7} \\ l' \bmod 2 + 2 & \text{when the current subframe is a special subframe,} \\ & \text{and a configuration of the special subframe is 3, 4 or 8} \\ l' \bmod 2 + 5 & \text{when the current subframe is a non-special subframe} \end{cases}$$

-continued $$l' = \begin{cases} 0, 1, 2, 3 & n_s \bmod 2 = 0, \text{ when the current subframe is a special subframe, and a configuration of the special subframe is } 1, 2, 6 \text{ or } 7 \\ 0, 1 & n_s \bmod 2 = 0, \text{ when the current subframe is not a special subframe, or a configuration of the special subframe is not } 1, 2, 6 \text{ or } 7 \\ 2, 3 & n_s \bmod 2 = 1, \text{ when the current subframe is not a special subframe, or a configuration of the special subframe is not } 1, 2, 6 \text{ or } 7 \end{cases}$$

wherein, $n_s$ is an index of a time slot in a radio frame.

2. The method of claim 1, further comprising mapping the reference signal sequence to a location $a_{k,l}^{(p)}$ of a sub-carrier k on the symbol l of an antenna port p according to a following expression:

$$a_{k,l}^{(p)} = \begin{cases} r(12 \cdot n_{PRB} + 3 \cdot l' + m') & \text{when } p = 7 \\ s \cdot r(12 \cdot n_{PRB} + 3 \cdot l' + m') & \text{when } p = 8 \end{cases}$$

wherein, $a_{k,l}^{(p)}$ refers to a location of the sub-carrier k on the symbol l of the antenna port p;

$k = 5 \cdot m' + N_{sc}^{RB} \cdot n_{PRB} + 1$, or $k = 5 \cdot m' + N_{sc}^{RB} \cdot n_{PRB}$;

$s = (-1)^{n_{PRB}+l'+m'}$, or $s = (-1)^{n_{PRB}+l'+m'+n_s}$, or $s = (-1)^{n_{PRB}+l'+m'+\lfloor l'/2 \rfloor}$, or $s = (-1)^{l'}$;

m'=0, 1 or 2;

$n_{PRB}$ refers to an index of a physical RB allocated by the system;

$N_{sc}^{RB}$ refers to a number of sub-carriers contained in one RB.

3. The method of claim 2, wherein, the special subframe is a subframe containing DwPTS time slots.

4. The method of claim 1, further comprising mapping the reference signal sequence to a location $a_{k,l}^{(p)}$ of a sub-carrier k on the symbol l of an antenna port p according to a following expression:

$$a_{k,l}^{(p)} = \begin{cases} r(12 \cdot n_{PRB} + 3 \cdot l' + m') & \text{when } p = 7 \\ s \cdot r(12 \cdot n_{PRB} + 3 \cdot l' + m') & \text{when } p = 8 \text{ and } l' \bmod 2 = 0 \\ -s \cdot r(12 \cdot n_{PRB} + 3 \cdot l' + m') & \text{when } p = 8 \text{ and } l' \bmod 2 = 1 \end{cases}$$

wherein, $a_{k,l}^{(p)}$ refers to a location of the sub-carrier k on the symbol l of the antenna port p;

$k = 5 \cdot m' + N_{sc}^{RB} \cdot n_{PRB} + 1$, or $k = 5 \cdot m' + N_{sc}^{RB} \cdot n_{PRB}$;

$s = (-1)^{n_{PRB}+m'}$, or $s = (-1)^{n_{PRB}+m'+n_s}$, or $s = (-1)^{n_{PRB}+m'+\lfloor l'/2 \rfloor}$, or $s = 1$;

m'=0, 1 or 2;

$n_{PRB}$ refers to an index of a physical RB allocated by the system;

$N_{sc}^{RB}$ refers to a number of sub-carriers contained in one RB.

5. The method of claim 4, wherein, the special subframe is a subframe containing DwPTS time slots.

6. The method of claim 1, further comprising mapping the reference signal sequence to a location $a_{k,l}^{(p)}$ of a sub-carrier k on the symbol l of an antenna port p according to a following expression:

$$a_{k,l}^{(p)} = \begin{cases} r(3 \cdot n_{PRB} + m' + 3 \cdot l' \cdot N_{RB}^{max,DL}) & \text{when } p = 7 \\ s \cdot r(3 \cdot n_{PRB} + m' + 3 \cdot l' \cdot N_{RB}^{max,DL}) & \text{when } p = 8 \end{cases}$$

wherein, $a_{k,l}^{(p)}$ refers to a location of the sub-carrier k on the symbol l of the antenna port p;

$k = 5 \cdot m' + N_{sc}^{RB} \cdot n_{PRB} + 1$, or $k = 5 \cdot m' + N_{sc}^{RB} \cdot n_{PRB}$;

$s = (-1)^{n_{PRB}+l'+m'}$, or $s = (-1)^{n_{PRB}+l'+m'+n_s}$, or $s = (-1)^{n_{PRB}+l'+m'+\lfloor l'/2 \rfloor}$, or $s = (-1)^{l'}$;

m'=0, 1 or 2;

$n_{PRB}$ refers to an index of a physical RB allocated by the system;

$N_{sc}^{RB}$ refers to a number of sub-carriers contained in one RB.

7. The method of claim 6, wherein, the special subframe is a subframe containing DwPTS time slots.

8. The method of claim 1, further comprising mapping the reference signal sequence to a location $a_{k,l}^{(p)}$ of a sub-carrier k on the symbol l of an antenna port p according to the following expression:

$$a_{k,l}^{(p)} = \begin{cases} r(3 \cdot n_{PRB} + m' + 3 \cdot l' \cdot N_{RB}^{max,DL}) & \text{when } p = 7 \\ s \cdot r(3 \cdot n_{PRB} + m' + 3 \cdot l' \cdot N_{RB}^{max,DL}) & \text{when } p = 8 \text{ and } l' \bmod 2 = 0 \\ -s \cdot r(3 \cdot n_{PRB} + m' + 3 \cdot l' \cdot N_{RB}^{max,DL}) & \text{when } p = 8 \text{ and } l' \bmod 2 = 1 \end{cases}$$

wherein, $a_{k,l}^{(p)}$ refers to a location of the sub-carrier k on the symbol l of the antenna port p;

$k = 5 \cdot m' + N_{sc}^{RB} \cdot n_{PRB} + 1$, or $k = 5 \cdot m' + N_{sc}^{RB} \cdot n_{PRB}$;

$s = (-1)^{n_{PRB}+m'}$, or $s = (-1)^{n_{PRB}+m'+n_s}$, or $s = (-1)^{n_{PRB}+m'+\lfloor l'/2 \rfloor}$, or $s = 1$;

m'=0, 1 or 2;

$n_{PRB}$ refers to an index of a physical RB allocated by the system;

$N_{sc}^{RB}$ refers to a number of sub-carriers contained in one RB.

9. The method of claim 8, wherein, the special subframe is a subframe containing DwPTS time slots.

10. The method of claim 1, wherein, the special subframe is a subframe containing DwPTS time slots.

11. A system for mapping a reference signal sequence in an advanced long term evolution system, which is used to map the reference signal sequence to an orthogonal frequency division multiplexing symbol l, comprising a mapping module, the mapping module is configured to determine the symbol l according to following expressions when the system uses a normal cyclic prefix:

$$l = \begin{cases} l'\bmod 2 + 2 + 3 \cdot \lfloor l'/2 \rfloor & \text{when the current subframe is a special subframe, and a configuration of the special subframe 1, 2, 6 or 7} \\ l'\bmod 2 + 2 & \text{when the current subframe is a special subframe, and a configuration of the special subframe is 3, 4 or 8} \\ l'\bmod 2 + 5 & \text{when the current subframe is a non-special subframe} \end{cases}$$

$$l' = \begin{cases} 0, 1, 2, 3 & n_s \bmod 2 = 0, \text{ when the current subframe is a special subframe, and a configuration of the special subframe is 1, 2, 6 or 7} \\ 0, 1 & n_s \bmod 2 = 0, \text{ when the current subframe is not a special subframe, or a configuration of the special subframe is not 1, 2, 6 or 7} \\ 2, 3 & n_s \bmod 2 = 1, \text{ when the current subframe is not a special subframe, or a configuration of the special subframe is not 1, 2, 6 or 7} \end{cases}$$

wherein, $n_s$ is an index of a time slot in a radio frame.

12. The system of claim 11, further comprising a first acquiring module and a second acquiring module, wherein, the first acquiring module is configured to acquire the index $n_{PRB}$ of the physical RB allocated by the system;

the second acquiring module is configured to acquire the number $N_{sc}^{RB}$ of the sub-carriers contained in the RB;

wherein, the mapping module is further configured to map the reference signal sequence to a location $a_{k,l}^{(p)}$ of a sub-carrier k on the symbol l of an antenna port p according to the index $n_{PRB}$ of the physical RB, the number $N_{sc}^{RB}$ of the sub-carriers and a following expression:

$$a_{k,l}^{(p)} = \begin{cases} r(12 \cdot n_{PRB} + 3 \cdot l' + m') & \text{when } p = 7 \\ s \cdot r(12 \cdot n_{PRB} + 3 \cdot l' + m') & \text{when } p = 8, \end{cases}$$

wherein, $k = 5 \cdot m' + N_{sc}^{RB} \cdot n_{PRB} + 1$, or $k = 5 \cdot m' + N_{sc}^{RB} \cdot n_{PRB}$;

$s = (-1)^{n_{PRB}+l'+m'}$, or $s = (-1)^{n_{PRB}+l'+m'+n_s}$, or $s = (-1)^{n_{PRB}+l'+m'+\lfloor l''/2 \rfloor}$, or $s = (-1)^{l'}$;

m'=0, 1 or 2;

alternatively, $$a_{k,l}^{(p)} = \begin{cases} r(12 \cdot n_{PRB} + 3 \cdot l' + m') & \text{when } p = 7 \\ s \cdot r(12 \cdot n_{PRB} + 3 \cdot l' + m') & \text{when } p = 8 \text{ and } l'\bmod 2 = 0 \\ -s \cdot r(12 \cdot n_{PRB} + 3 \cdot l' + m') & \text{when } p = 8 \text{ and } l'\bmod 2 = 1, \end{cases}$$

wherein, $s = (-1)^{n_{PRB}+m'}$, or $s = (-1)^{n_{PRB}+m'+n_s}$, or $s = (-1)^{n_{PRB}+m'+\lfloor l''/2 \rfloor}$, or $s = 1$;

alternatively, $$a_{k,l}^{(p)} = \begin{cases} r(3 \cdot n_{PRB} + m' + 3 \cdot l' \cdot N_{RB}^{max,DL}) & \text{when } p = 7 \\ s \cdot r(3 \cdot n_{PRB} + m' + 3 \cdot l' \cdot N_{RB}^{max,DL}) & \text{when } p = 8, \end{cases}$$

wherein, $s = (-1)^{n_{PRB}+l'+m'}$, or $s = (-1)^{n_{PRB}+l'+m'+n_s}$, or $s = (-1)^{n_{PRB}+l'+m'+\lfloor l''/2 \rfloor}$, or $s = (-1)^{l'}$;

alternatively, $$a_{k,l}^{(p)} = \begin{cases} r(3 \cdot n_{PRB} + m' + 3 \cdot l' \cdot N_{RB}^{max,DL}) & \text{when } p = 7 \\ s \cdot r(3 \cdot n_{PRB} + m' + 3 \cdot l' \cdot N_{RB}^{max,DL}) & \text{when } p = 8 \text{ and } l'\bmod 2 = 0 \\ -s \cdot r(3 \cdot n_{PRB} + m' + 3 \cdot l' \cdot N_{RB}^{max,DL}) & \text{when } p = 8 \text{ and } l'\bmod 2 = 1, \end{cases}$$

wherein, $s = (-1)^{n_{PRB}+m'}$, or $s = (-1)^{n_{PRB}+m'+n_s}$, or $s = (-1)^{n_{PRB}+m'+\lfloor l''/2 \rfloor}$, or $s = 1$.

13. The system of claim 12, wherein, the special subframe is a subframe containing DwPTS time slots.

14. The system of claim 11, wherein, the special subframe is a subframe containing DwPTS time slots.

* * * * *